United States Patent [19]
Robert

[11] 4,383,239
[45] May 10, 1983

[54] DETECTOR FOR DETECTING THE PASSAGE OF HEAVY OBJECTS ON A ROADWAY

[75] Inventor: Richard C. Robert, Ollainville, France

[73] Assignee: Compagnie Generale d'Automatisme, Paris, France

[21] Appl. No.: 287,656

[22] Filed: Jul. 28, 1981

[30] Foreign Application Priority Data

Jul. 28, 1980 [FR] France ........ 80 16562

[51] Int. Cl.³ ........ G01L 1/16; G08G 1/07
[52] U.S. Cl. ........ 340/38 R; 377/9
[58] Field of Search ........ 340/38 R, 39, 666; 235/92 TC; 177/210 R, 210 EM, 211

[56] References Cited

U.S. PATENT DOCUMENTS 3,105,952 10/1963 Kidder ........ 340/38 R
3,750,125 7/1973 Ross et al. ........ 340/38 R

FOREIGN PATENT DOCUMENTS 2291559 6/1976 France ........ 235/92 TC
2373784 7/1978 France .
1209506 10/1970 United Kingdom .
2003635 3/1979 United Kingdom .

OTHER PUBLICATIONS

International Construction, vol. 10, No. 5, May 1971, Naywards Heath (GB), Elliott: "Loop Detectors Speed Up London's Traffic Flow", p. 5, lines 6–7, 22, 26.

*Primary Examiner*—Thomas A. Robinson
*Attorney, Agent, or Firm*—Sughrue, Mion, Zinn, Macpeak, and Seas

[57] ABSTRACT

A detector for detecting the passage of heavy objects on a roadway, wherein the detector is an elongate strip in the form of nested channel-section members, said members comprising, from the outside towards the inside a first channel section bar (1) made of a strong material;

a second channel section bar (2) made of a shock-absorbing material embedded in the channel of said first bar;

a third channel section bar (3) made of a strong material embedded in the channel of said second bar; and a sensor (4) embedded in the channel of said third bar.

3 Claims, 1 Drawing Figure

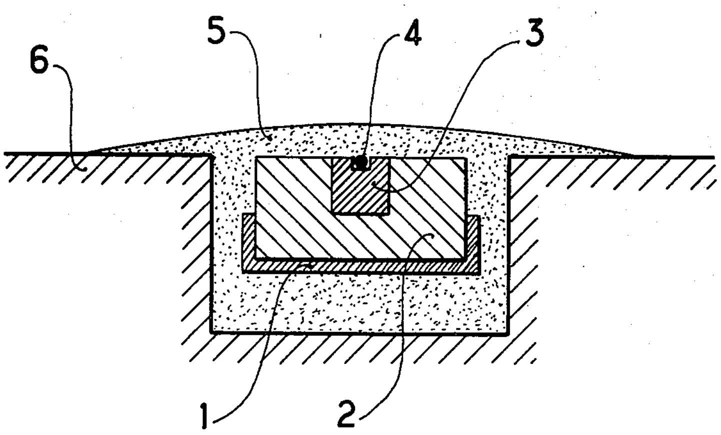
5
4
3
6
1
2

DETECTOR FOR DETECTING THE PASSAGE OF HEAVY OBJECTS ON A ROADWAY

The present invention relates to an installation for detecting the passage of heavy objects, said installation including a piezo-electric sensor inserted in a roadway.

BACKGROUND OF THE INVENTION

The invention applies especially to counting the axles of vehicles on a road. Axle-counting devices are known which are constituted by pneumatic or electric sensors disposed across the surface of a roadway. However, such sensors disposed directly on the roadway may suffer damage or may be torn away, in particular in snowbound regions when snow-ploughs pass over them. Piezo-electric sensors have then been used, disposed in roadways but whereas operation is satisfactory in the case of asphalt roadways, it is not in the case of concrete roadways. Concrete roadways have joints, and wheels passing over these joints set up pressure waves which propagate up to and are detected by the sensor. The result of this is that each vehicle axle is counted several times.

A solution to this problem has been found which consists in using a long thin sensor of the piezo-electric type coated with a first layer of resin and disposed in a groove in the roadway, the walls of said groove being coated with a bonding layer and the space between the first resin and the bonding layer being filled with a second resin of a rubbery kind. This method, although effective, is tricky to apply due to the fragility of the sensor and to the multiplicity of operations to be carried out in situ.

The present invention therefore aims to provide a strong detector which is easy to manufacture in a factory, to transport and to handle and which requires only a minimum of operations in situ.

SUMMARY OF THE INVENTION

The present invention provides a detector for detecting the passage of heavy objects on a roadway, wherein the detector is an elongate strip in the form of nested channel-section members, said members comprising, from the outside towards the inside:

a first channel section bar made of a strong material;

a second channel section bar made of a shock-absorbing material embedded in the channel of said first bar;

a third channel section bar made of a strong material embedded in the channel of said second bar; and a long thin sensor embedded in the channel of said third bar.

Advantageously, the first section bar is made of sheet steel, the second of neoprene and the third of milled aluminium, and the sensor may be of the ceramic piezo-electric type. The first and second section bars are glued together and the third section bar is either glued to or surface moulded over the second, while the third section bar is glued to the sensor.

DESCRIPTION OF PREFERRED EMBODIMENT

A cross-section of a detector in accordance with the invention is illustrated in the sole FIGURE of the accompanying drawing. An outer channel section bar 1 is made of 2 mm thick sheet steel and is 40 mm wide (outside) and 10 mm high. Neoprene intermediate channel-section bar 2 is 36 mm wide and 18 mm high. A third channel section bar 3 is 10 mm wide and 10 mm high with a milled channel of 3 mm by 3 mm for a sensor 4 per se.

The detector in accordance with the invention can be installed in a roadway as follows:

A groove about 50 mm wide and about 30 mm deep is cut in the roadway.

Props or braces are disposed here and there in the ditch to allow the detector to be subsequently centred and levelled.

A sufficient quantity of adhesive resin 5 is poured into the ditch.

The detector is positioned.

The excess resin is turned down over the top of the detector and over the edges of the ditch to provide an even surface.

The applicant has found that with the materials and the dimensions set forth hereinabove, neoprene constitutes a shock absorber which withstands effectively the transmission of vibrations propagated in the ground and that the third channel section bar provides good protection for the sensor while collecting a signal of sufficient amplitude and transmitting it correctly to the sensor when a vehicle passes thereover.

Said third channel section bar also performs a function during manufacture. Indeed, known piezo-electric sensors generally have appreciable deformations and are rather lacking in flexibility and it is therefore desirable to embed them in sufficiently rigid parts.

With the above-mentioned dimensions, the second channel section bar protrudes out of the channel flanges in the first section bar. The applicant has found this disposition advantageous in that the electric signal supplied by the sensor when a vehicle passes over it has a more regular form, whereas in the case where the second channel-section bar comes only flush with the flanges of the first channel section bar, interference signals are observed at the instants when the wheel of the vehicle passes over the upstream flange or the downstream flange.

I claim:

1. A detector mountable in a roadway groove for detecting the passage of heavy objects traversing said roadway, said detector comprising an elongate strip in the form of nested channel-section members, said members comprising, from the outside member towards the inside:

a first channel section bar made of a strong material;

a second channel section bar made of a shock-absorbing material embedded in the channel of said first bar;

a third channel section bar made of a strong material embedded in the channel of said second bar; and a sensor embedded in the channel of said third bar.

2. A detector according to claim 1 wherein said second bar protrudes beyond the flanges of said first bar.

3. A method of installing a detector for detecting the passage of heavy objects traversing a roadway, said method comprising the following steps:

cutting a groove within said roadway;

pouring adhesive resin into said groove;

positioning a detector comprising an elongated strip in the form of nested channel section members within said groove with the outside channel-section member in contact with the adhesive resin and with said nested channel-section members comprising from the outside member towards the inside;

a first channel-section bar made of a strong material;

a second channel-section bar made of a shock-absorbing material embedded in the channel of said first bar;

a third channel section bar made of a strong material embedded in the channel of said second bar; and a long thin piezoelectric type sensor disposed in the channel of said third bar;

and filling the remainder of the groove with additional adhesive resin and turning down the excess resin over the detector and over edges of the groove.

* * * * *